(12) United States Patent
Dögel

(10) Patent No.: US 7,993,204 B2
(45) Date of Patent: Aug. 9, 2011

(54) TORSIONAL VIBRATION DAMPER ARRANGEMENT

(75) Inventor: Thomas Dögel, Bad Kissingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 376 days.

(21) Appl. No.: 12/270,291

(22) Filed: Nov. 13, 2008

(65) Prior Publication Data
US 2009/0131178 A1    May 21, 2009

(30) Foreign Application Priority Data
Nov. 15, 2007 (DE) ........................ 10 2007 054 567

(51) Int. Cl.
*F16D 3/80* (2006.01)
(52) U.S. Cl. .......................................................... 464/27
(58) Field of Classification Search .................. 464/24, 464/27, 68.3; 192/208; 74/573.11; 188/269; 267/140.13
See application file for complete search history.

(56) References Cited

U.S. PATENT DOCUMENTS

| | | | |
|---|---|---|---|
| 2,628,486 A * | 2/1953 | Huff | 464/27 |
| 3,812,724 A * | 5/1974 | Curtz et al. | 74/573.11 X |
| 4,903,544 A * | 2/1990 | Naudin et al. | 464/68.3 |
| 2009/0127040 A1* | 5/2009 | Busold et al. | 188/269 |
| 2009/0133529 A1* | 5/2009 | Kister et al. | 74/573.11 |
| 2010/0090382 A1* | 4/2010 | Carlson et al. | 267/140.13 |

FOREIGN PATENT DOCUMENTS

| | | | |
|---|---|---|---|
| DE | 102006061342 A1 * | 6/2008 | |
| FR | 1.346.685 | 11/1963 | |
| WO | WO 2007/065569 A1 | 6/2007 | |

* cited by examiner

*Primary Examiner* — Greg Binda
(74) *Attorney, Agent, or Firm* — Cohen Pontani Lieberman & Pavane LLP

(57) ABSTRACT

A torsional vibration damper with a primary side and a secondary side, wherein rotation of the primary side relative to the secondary side causes displacement of hydraulic fluid from at least one displacement chamber and compression of pneumatic fluid in at least one compensating chamber. A first displacement chamber assembly includes a pair of axially opposed end walls bounding each displacement chamber in both axial directions and a circumferential wall bounding it in one radial direction, and a second displacement chamber assembly bounds it in the other radial direction. At least one circumferential recess provided in one of the first and second displacement chamber assemblies is engaged by at least one projection provided on the other of the first and second displacement chamber assemblies to limit the relative rotation.

12 Claims, 8 Drawing Sheets

TORSIONAL VIBRATION DAMPER ARRANGEMENT

BACKGROUND OF THE INVENTION

1. Field of the Invention

The invention pertains to a torsional vibration damper arrangement of the type having a primary side and a secondary side, which is able to rotate around an axis of rotation relative to the primary side against the action of a damper fluid arrangement.

2. Description of the Related Art

The damper fluid arrangement has a first damper fluid of lower compressibility in at least one displacement chamber and a second damper fluid of higher compressibility in at least one compensating chamber. Upon a decrease in the volume of at least one displacement chamber caused by the rotation of the primary side relative to the secondary side and thus upon displacement of fluid from this displacement chamber, the second damper fluid is compressed in at least one compensating chamber. The minimum of one displacement chamber is bounded by a first displacement chamber assembly with end walls which form the axial boundaries of the minimum of one displacement chamber in both axial directions and with a circumferential wall which forms the boundary of the displacement chamber in one radial direction, and by a second displacement chamber assembly, which is able to rotate around the axis of rotation relative to the first displacement chamber assembly and which forms the boundary of the minimum of one displacement chamber in the other radial direction.

In these types of torsional vibration damper arrangements, there is basically always the danger that, when the torques to be transmitted rise too sharply or when the torques peak at too high a value during torque fluctuations, sections of the two displacement chamber assemblies, i.e., the sections which form the boundaries of the minimum of one displacement chamber, will collide with each other. In the displacement chamber assemblies, furthermore, there are various openings, which allow the first damper fluid to enter and to leave; and when the relative rotation between the primary side and the secondary side is too pronounced, the sealing elements provided on one of the displacement chamber assemblies can pass over the openings in the other displacement chamber assembly. This can lead briefly to a short-circuit in the fluid transmission between two displacement chambers, and if this is repeated often enough, it can lead to damage to the sealing elements.

SUMMARY OF THE INVENTION

The goal of the present invention is to provide a torsional vibration damper arrangement in which, without impairment to the fluidic damping functionality, the possibility is given that the relative movement between the primary side and the secondary side can be kept within a range which avoids unfavorable operating states or damage.

At least one circumferential recess is provided in one of the assemblies of the second displacement chamber assembly and at least one of the end walls, and an engaging projection is provided on the other assembly of the second displacement chamber assembly and at least one of the end walls. This projection is assigned to the minimum of one circumferential recess to produce an angle of rotation-limiting function and/or a frictional device function between the two displacement chamber assemblies.

In the present invention, measures are taken in an area outside the minimum of one displacement chamber to ensure that, by means of an angle of rotation-limiting function, excessive relative rotation between the primary side and the secondary side is avoided and/or that, by the introduction of a friction function, energy is absorbed during the relative rotation between the primary side and the secondary side, which also makes it possible to prevent excessive rotation. Because these measures are provided in an area where the two displacement chamber assemblies are located opposite each other, that is, not inside the displacement chamber itself, their structure, volume, and thus their damping characteristics remain unimpaired.

The minimum of one circumferential recess is preferably formed in an end surface of one of the assemblies.

To provide a circumferential movement-limiting function for the primary side and the secondary side with respect to each other, it is also proposed that the minimum of one circumferential recess comprise a limited circumferential length.

To avoid an overly strong braking action when the rotation-limiting functionality goes into effect, it is also proposed that an elastic stop for an engaging projection be provided in the area of at least one circumferential end of at least one circumferential recess. It is possible, for example, for the elastic stop to comprise a spring element.

The spring element can be installed under prestress, so that a certain stop moment or load moment must be exceeded before the elastic functionality of this spring element can go into action.

Alternatively or in addition, a frictional functionality can be realized in the torsional vibration damper arrangement according to the invention by providing a friction element in one of the assemblies to cooperate with at least one engaging projection on the other assembly. This friction element can be carried along by the engaging projection in the circumferential direction along at least one opposing friction surface. Especially when, in a design of this type, the minimum of one engaging projection also provides a circumferential movement-limiting functionality in cooperation with the one of the assemblies, a merger of the two functions can be achieved, and a very simple design can be realized as a result.

For example, a friction element mounting recess can be provided in the one assembly.

To realize a reliable integration of the friction functionality into the one assembly, it is proposed that the friction element mounting recess be at least partially closed off by a closure element, which preferably provides an opposing friction surface and past which the minimum of one engaging projection extends so that it can interact with the assigned friction element.

Thus the closure element can form a boundary of the minimum of one circumferential recess. If, for example, this circumferential recess is uninterrupted in the circumferential direction, primarily a frictional functionality is provided. If this circumferential recess is limited in the circumferential direction, then the closure element simultaneously fulfills an angle of rotation-limiting functionality; that is, the end of the recess therefore also serves as a stop, which prevents further movement of the minimum of one engaging projection.

To suppress a frictional contribution to the vibration damping in the range of low torques or low torque fluctuations, it is proposed that the minimum of one engaging projection cooperate with the associated friction element with a certain amount of circumferential play.

In addition, the structure of the inventive torsional vibration damper arrangement can be such that the minimum of one displacement chamber is bounded in a first circumferential direction by a circumferential boundary projection provided on the first displacement chamber assembly and in a second circumferential direction by a circumferential boundary projection provided on the second displacement chamber assembly.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
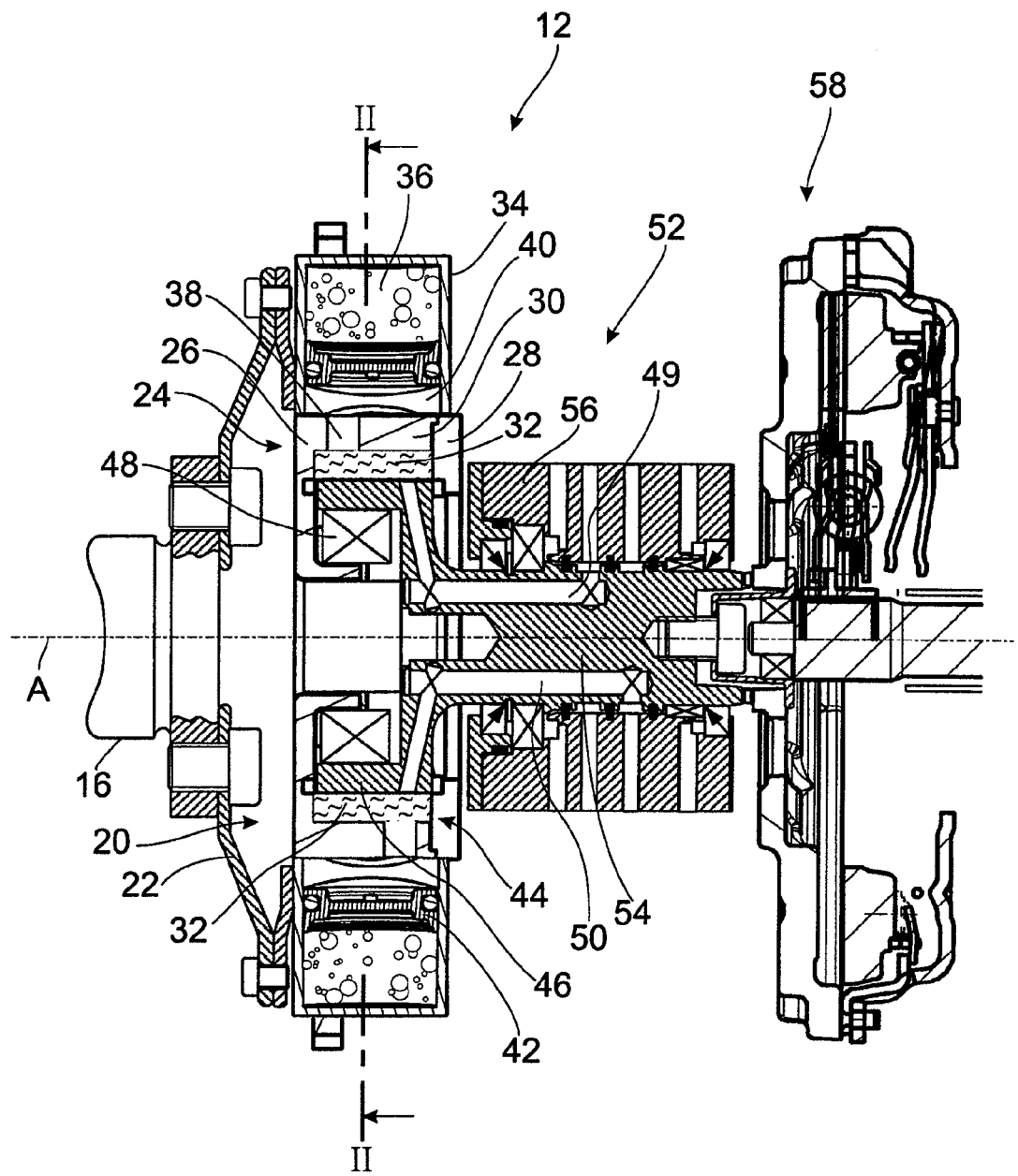
FIG. 1 shows a longitudinal cross section through a part of a drive train with a torsional vibration damper arrangement designed in the manner of a gas spring-dual mass flywheel.

First, the general structure of a torsional vibration damper arrangement 12 designed according to the type of a gas spring-dual mass flywheel is described with reference to FIGS. 1 and 2

The torsional vibration damper arrangement 12 includes a primary side 20, which is or can be connected to the drive shaft 16 for rotation in common around the axis of rotation A by means of a flexplate arrangement 22 or the like. This primary side 20 has a first displacement chamber assembly 24, the two end walls 26, 28 and the outer circumferential wall 30 of which form the axial and radial boundaries of a plurality of displacement chambers 32, 33, arranged in a row around the circumference. Outside the outer circumferential wall 30, there is an arrangement, star-shaped with respect to the axis of rotation A, of compensating cylinders 34, in each of which a compensating chamber 36 is formed. The two different types of chambers can cooperate with each other in such a way that one compensating chamber 36 is assigned to each displacement chamber 32, 33; that several compensating chambers 36 are assigned to one displacement chamber 32; or that one compensating chamber 36 works together with several displacement chambers 32, 33. This cooperation takes place by way of a through-opening 38 in the outer circumferential wall 30 of each displacement chamber 32, 33, and by way of a connecting chamber 40, extending in the circumferential direction along the outer circumferential wall 30. A separating piston 42, which is able to move back and forth inside the compensating cylinder 34, separates the first damper fluid, which is present in the displacement chamber or chambers 32, 33, is essentially incompressible, and can be, for example, an oil, from the second damper fluid contained in the assigned compensating chamber 36, this fluid being compressible, namely, a fluid such as air or some other gas.

A secondary side 44 of the torsional vibration damper arrangement 12 includes a second displacement chamber assembly 46, which is supported rotatably on the first displacement chamber assembly 24 by means of a bearing 48. The second displacement chamber assembly 46 forms the boundary of the displacement chambers 32 on the radially inner side and is guided in a fluid-tight manner with respect to the side walls 26, 28 by means of appropriate sealing arrangements.

To provide the boundaries of the displacement chambers 32, 33 in the circumferential direction, circumferential boundary projections 60, 62 are provided on the two displacement chamber assemblies 24, 46, each of these projections extending radially toward the other displacement chamber assembly, so that the circumferential boundary projection 60 of the primary-side first displacement chamber assembly 24 forms one of the boundaries of each displacement chamber 32, 33, and the circumferential boundary projection 62 of the secondary-side second displacement chamber assembly 46 forms the other boundary of each chamber. Upon relative rotation of the primary side 20 versus the secondary side 44 in a first direction of relative rotation, the volume of the displacement chamber 32 located in the upper part of FIG. 1, for example, decreases, so that the first damper fluid is displaced out of this chamber into the assigned connecting chamber 40, and the second damper fluid in one or more compensating chambers 36 is compressed, whereas, correspondingly, the volume of the other displacement chamber increases. Upon relative rotation in the opposite direction of relative rotation, the volume of the other displacement chamber decreases, so that the first damper fluid displaced from it exerts a load on the second damper fluid in the assigned compensating chambers 36. It should be pointed out that, of course, the two displacement chamber assemblies 24, 46 can form the boundaries of a plurality of displacement chambers, possibly four, for example, following each other in a row around the circumference, two of which are always acting in parallel, that is, the volume of one of them increases while that of the other decreases.

To adjust the damping characteristic, i.e., the pressure relationships of the first (hydraulic) damper fluid in the displacement chambers 32, 33, the first damper fluid can be supplied to and/or removed from these chambers via channels 49, 50, visible in FIG. 1. For this purpose, a rotary pass-through 52 is provided, the rotating part 54 of which is connected to the second displacement chamber assembly 46, whereas the non-rotating part 56 is connected to a source of pressurized fluid for the first damper fluid and/or to a reservoir. Valve arrangements (not shown) can be used to increase or to decrease the fluid pressure of the first damper fluid in the various displacement chambers 32, 33 and thus to adjust the damping characteristic, because it is possible in this way to vary the preload pressure which the first damper fluid exerts on the separating pistons 42, i.e., the pressure which acts on the second (pneumatic) damper fluid in the compensating chambers 36, the pressure of which second fluid is usually held positive relative to the environment.

The rotating part 54 of the rotary pass-through 52 can be connected for rotation in common to a friction clutch 58 by means of a set of axial teeth such as a set of spur gear teeth. It should be pointed out that the friction device 58 represents only an example of this type of separating/power-transmitting device which comes next in the drive train. It would also be possible, of course, for a hydrodynamic torque converter, a wet-running friction device, or, in the case of a hybrid drive, an electric machine, to be in this following position.

Figure 2:
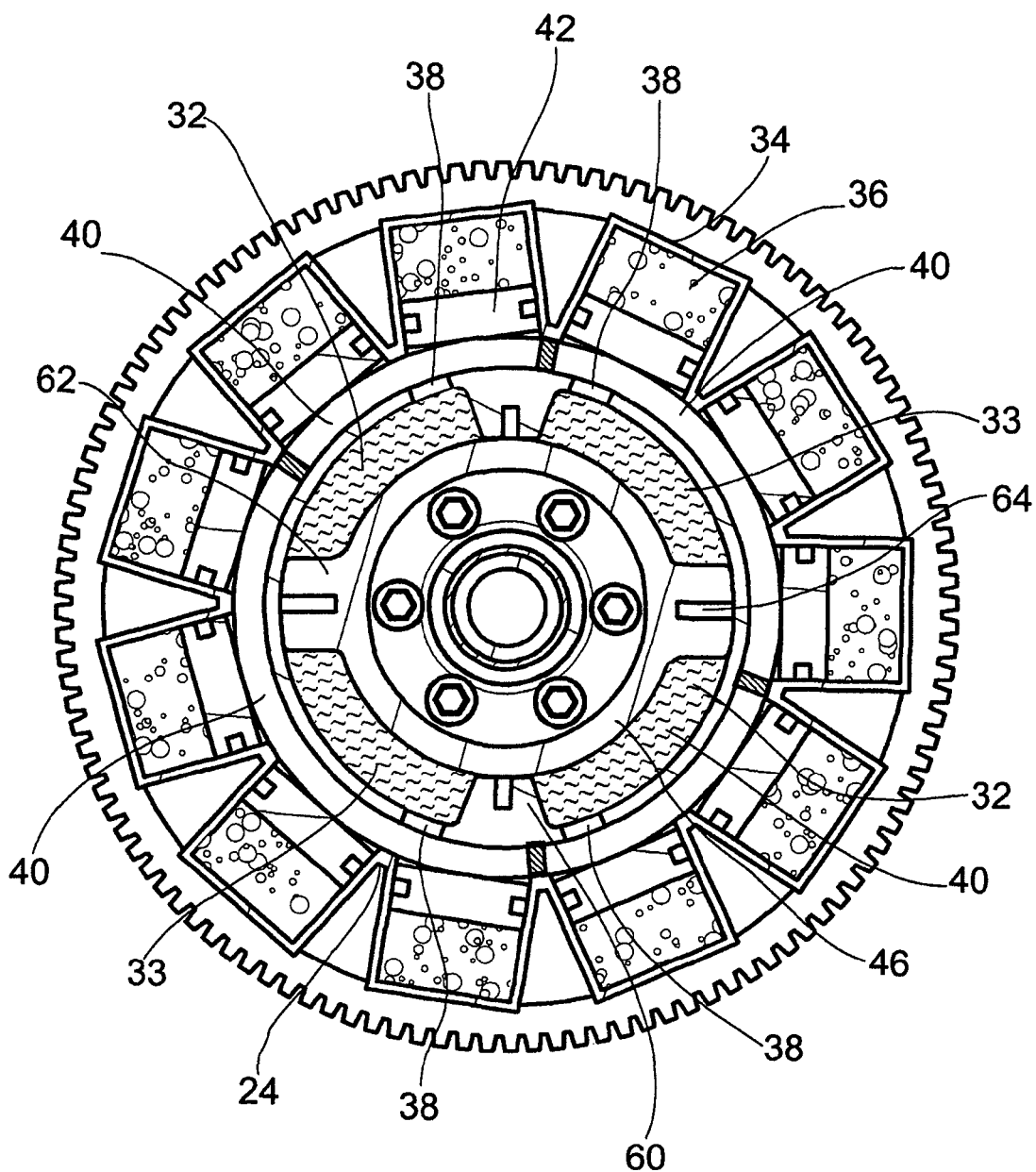
FIG. 2 shows a cross-sectional view of the torsional vibration damper arrangement according to FIG. 1.
Figure 4:
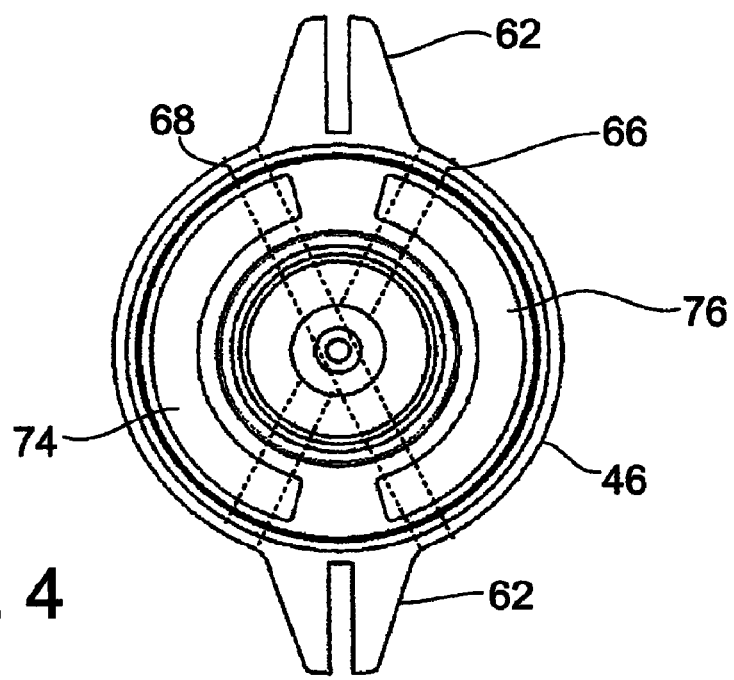
FIG. 4 shows an end view of the second displacement chamber assembly shown in FIG. 3.

In FIG. 2, we see the compensating cylinders 34, arranged in a star-like manner around the axis of rotation A, with the compensating chambers 36 formed therein. These chambers can be provided on a common assembly. Displacement chambers 32, 32; 33, 33 are also provided, which are assigned to each other to form pairs. Each of these chambers is bounded in the circumferential direction by a primary-side circumferential boundary projection 60 and by a secondary-side circumferential boundary projection 62. Each of these projections extends in the radial direction toward the other displacement chamber assembly and is sealed off by schematically illustrated sealing elements 64 against this other assembly and/or the side walls 26, 28 to prevent the passage of the first damper fluid. The pairs of displacement chambers 32, 32; 33, 33, the individual chambers of which are diametrically opposed to each other, are connected to each other by connecting channels 66, 68, as indicated in FIG. 4, for the exchange of fluid, so that essentially the same pressure, namely, that of the first damper fluid, is present in both displacement chambers of each pair.

It can be seen in FIG. 2, furthermore, how the various compensating cylinders 34 are assigned to the displacement chambers 32 or 33. Thus, each of the two displacement chambers 32, 32 is in working connection via an opening 38 and the assigned intermediate chamber 40 with two compensating cylinders 34 and thus with two compensating chambers 36. One of the two displacement chambers 33, 33 is connected by an opening 38 and by the intermediate chamber 40 assigned to it to three compensating cylinders 34, whereas the other displacement chamber 33 is connected similarly to four compensating cylinders 34.

In torque-transmitting mode, the primary side 20 and the secondary side 44 turn relative to each other, starting from, for example, the neutral relative rotational position shown in FIG. 2, in which the circumferential boundary projections 60 and 62 are at an angle of approximately 90° to each other and the displacement chambers 32, 32; 33, 33 have, for example, essentially the same circumferential length. As this rotation proceeds, therefore, the two circumferential boundary projections 60, 62 come closer together. One of the results of this can be that, if the torque to be transmitted increases excessively, these circumferential boundary projections will collide with each other. There is also basically the possibility that, for example, the sealing elements 64 provided on the secondary-side circumferential boundary projections 62 pass at least partially over the openings 38. The same applies to the primary-side circumferential boundary projections 60 with respect to the channels 66, 68. It is thus possible, for a brief period of time, for a fluid-exchange connection to be formed between two circumferentially adjacent displacement chambers 32, 33 separated from each other by one of the circumferential boundary projections 60 or 62. The passage of the sealing elements 64 over the openings is also unfavorable, because this can lead to damage.

To counteract this effect, it is provided according to the invention that an angle of rotation-limiting functionality, to be described in the following, is realized between the two displacement chamber assemblies 24, 46.

Figure 3:
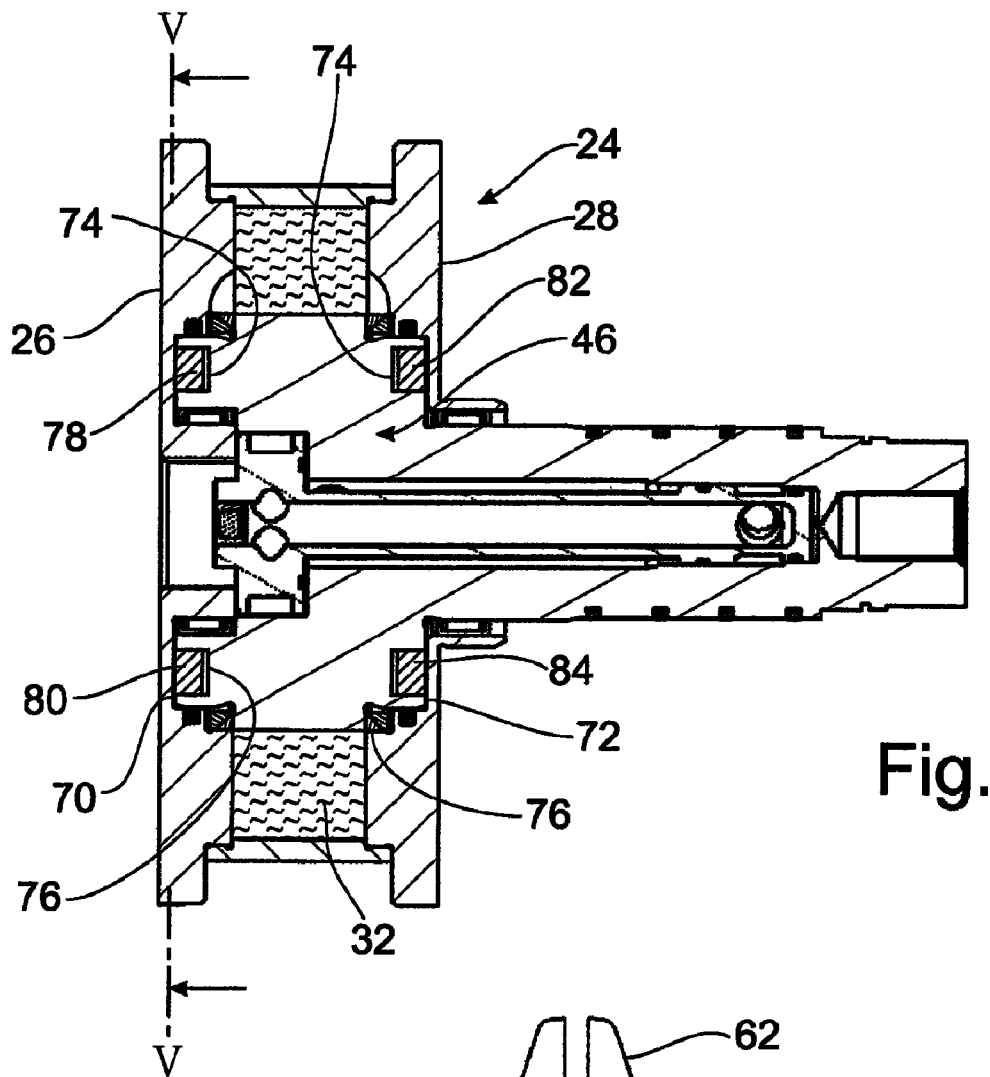
FIG. 3 shows the two displacement chamber assemblies of the torsional vibration damper arrangement in greater detail.

As can be seen in FIGS. 3 and 4, the second displacement chamber assembly 46 includes a circumferential recess 74, 76, which extends over a limited circumferential angle of approximately 160°, in each of its end surfaces 70, 72, opposite the end walls 26, 28 and covered by them. The two end walls 26, 28 have engaging projections 78, 80, 82, 84 to cooperate with each of these circumferential recesses 74, 76. These projections can be separate components which are attached to the end walls 26, 28 by means of rivets, for example, or by welding, but they can just as well be produced as integral parts of the walls by a process such as metal-forming, casting, or machining.

Figure 5:
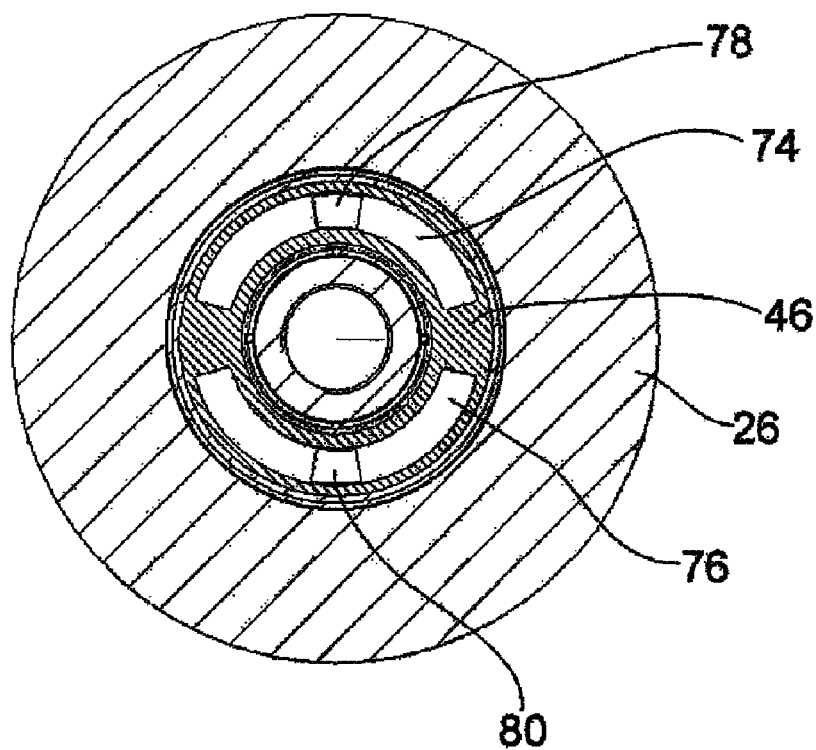
FIG. 5 shows a cross-sectional view of the displacement chamber assemblies shown in FIG. 3 along a line V-V in FIG. 3.

As FIG. 5 shows, when the primary side 20 and the secondary side 44 are occupying the neutral relative rotational position of FIG. 2, the engaging projections 78, 80 engage essentially in the middles of their assigned circumferential recesses 74, 76, so that, in both directions of relative rotation proceeding from the neutral position, essentially the same relative angle of rotation is permitted. The engaging projections 78, 80, 82, 84 come to rest against the associated circumferential ends of the circumferential recesses 74, 76 and thus block the primary side 20 and the secondary side 44 from further rotation before a relative angle of rotation is reached in which an unwanted interaction can occur between a sealing element and an opening or between the approaching circumferential boundary projections.

Figure 6:
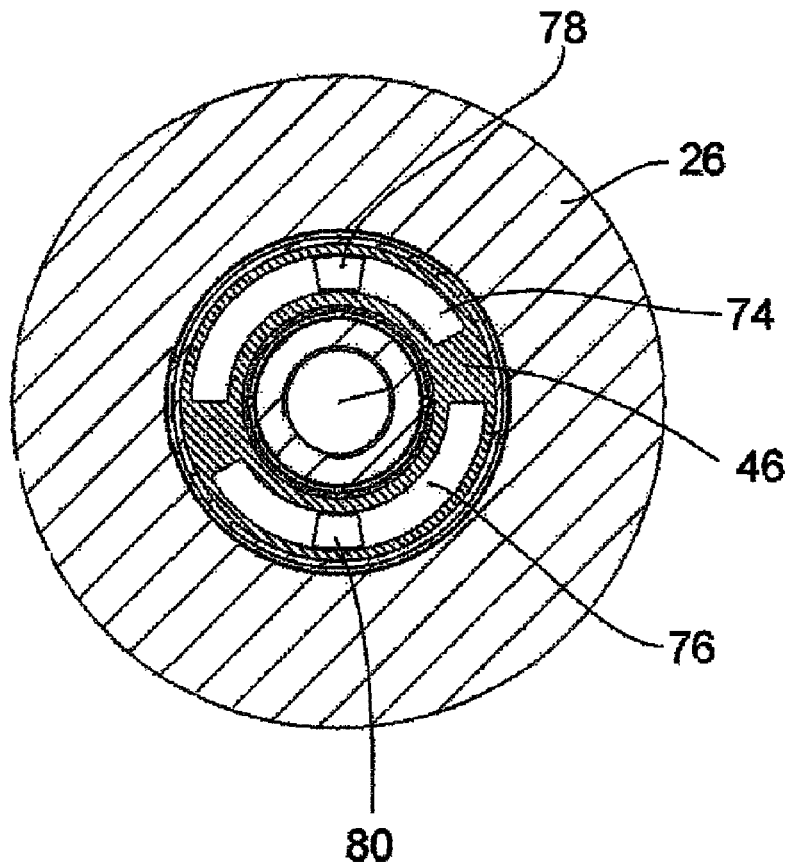
FIG. 6 shows a diagram, corresponding to FIG. 5, of an alternative type of design.

FIG. 6 shows the case in which the primary side 20 and secondary side 44 are again in the neutral relative rotational position, but the illustrated engaging projections 78, 80 do not engage in the middles of their assigned circumferential recesses 74, 76. This is therefore a design example in which the possible degree of relative rotation is not the same in both directions of relative rotation. Thus, for example, a larger angle of relative rotation can be allowed in the pulling mode than in pushing mode.

Figure 7:
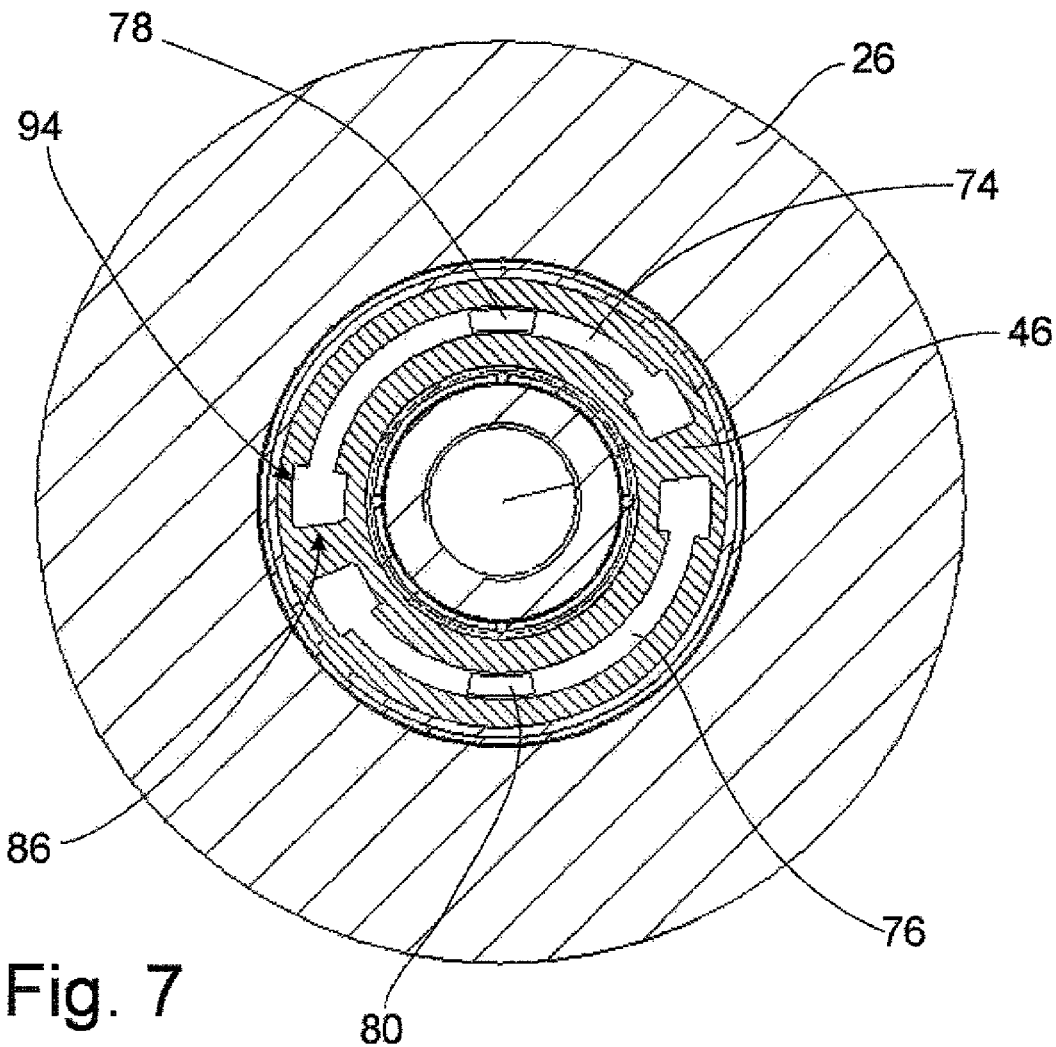
FIG. 7 shows a view, corresponding to FIG. 5, of another alternative type of design.
Figure 8:
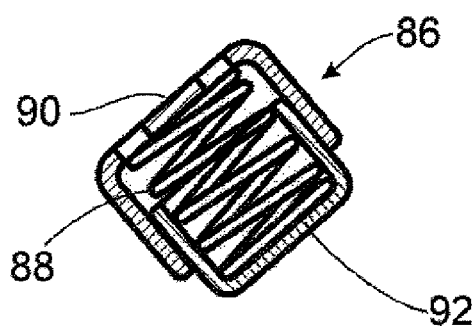
FIG. 8 shows an elastic stop for the arrangement shown in FIG. 7.

FIG. 7 shows an elaboration, in which provisions are made not only to limit the relative angle of rotation but also to damp the impact against the endpoint. For this purpose, an elastically acting stop 86, shown in FIG. 8, is provided in each of the circumferential end areas of the circumferential recesses 74. This stop includes, for example, a helical compression spring 88, which is held in two cup-like housing shells 90, 92 which can telescope into and out of each other.

Circumferential recesses 74 are made somewhat larger in the circumferential end area 94, so that the elastic stops 86 can be inserted there. The stop can be installed under prestress. When the engaging projection 78 moves into this circumferential end area 94, it exerts a force in the circumferential direction on the stop 86 located there. Compression does not occur, however, until the load moment or the force exerted by the engaging projection 78 exceeds the prestress. Once this prestress is exceeded, the helical compression spring 88 can be compressed, and this compression can continue until the two housing shells 90, 92 have telescoped into each other to the maximum possible extent. The shells therefore also realize an overload protection function for the helical compression spring 88.

Figure 9:
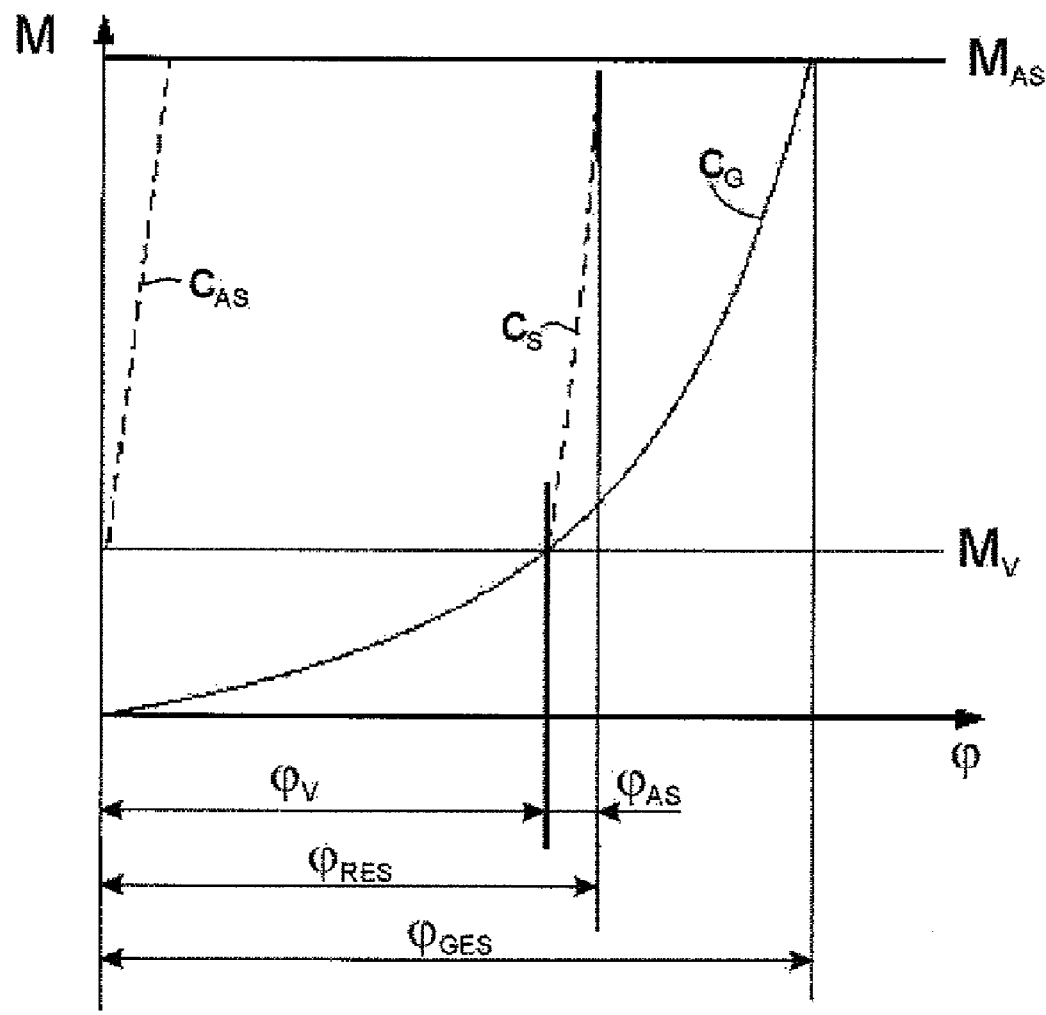
FIG. 9 shows a diagram of the torque plotted versus the angle of relative rotation between the primary side and the secondary side.

The function of a torsional vibration damper arrangement 12 equipped with this type of elastic stop function is shown in FIG. 9. We can see in FIG. 9 the progressive characteristic $C_G$ of the torsional vibration damper arrangement acting with fluidic damping and gas compression. Within the normal angle of relative rotation, proceeding here again from the neutral position to the relative rotational position $\phi_V$, essentially only the fluidic damping is acting. When, as a result of sufficient relative rotation, the transmitted torque reaches the value $M_V$, which also corresponds to the prestressing moment of the elastic stops 86, the elastic stop functionality also goes into effect as a result of the actuation of a stop by an engaging projection, which thus exerts force on the helical compression spring; that is, the characteristic $C_{AS}$ of the helical compression spring or springs 88, which were installed under prestress, are superimposed on the characteristic $C_G$ of the gas spring-dual mass flywheel. What then results is therefore the overall characteristic $C_S$, which goes into effect when the angle $\phi_V$ is reached. This characteristic $C_S$ then lies within an additional angular range $\phi_{AS}$, in which the helical compression springs 88 still to be compressed also go into action. As a result of the angle of rotation-limiting function, the angle of relative rotation which can thus be obtained between the primary side 20 and the secondary side 44 when the stops 86 have been compressed to essentially their maximum extent is defined by the angle $\phi_{RES}$, which, as FIG. 9 shows, is still smaller than the angle of relative rotation $\phi_{GES}$, which is possible in principle for the gas spring-dual mass flywheel, and which is limited ultimately by the contact in the circumferential direction between the circumferential boundary projections 60, 62.

It should be pointed out that FIG. 9 shows an example in which the fluidic damping functionality on the one hand and the prestress of the stops 86 on the other hand are adapted to each other in such a way that, when the angle of relative rotation $\phi_V$ is reached, the moment then present corresponds essentially to the prestressing moment $M_V$ of the stops 86. If this prestressing moment of the stops 86 were to be given a higher value, then a torque range would be present in which no relative rotation will in fact take place. Only after the torque has increased even more and the prestressing moment now present is reached or exceeded, would it be possible, in conjunction with the compression of the helical compression springs 88, for further relative rotation to occur. If the prestressing moment were selected so that the torque to be transmitted by the vibration damper arrangement is greater than the torque at which the stops 86 go into effect, then, if the torque does not increase further, the helical compression springs 88 would be subjected to load until the moments or forces are equalized.

It can also be seen from the diagram of FIG. 9 that, when the displacement chambers are put under pressure upon the occurrence of torque fluctuations or sharply rising torque within the normal effective range $\phi_V$ but are being supplied at a sufficient rate with pressurized first damper fluid by way of the rotary pass-through 52, when, therefore, further relative rotation can be reliably counteracted, only the fluidic damping functionality is in effect. Only when a sufficiently rapid fluid supply is not possible or when there is possibly a defect in the pressurized fluid supply system will the stops 86 go into effect, and what is then obtained will be the overall characteristic $C_S$, which arises either from a superimposition of the elastic stiffness of the springs and the compression of the gas or, for example, in the case of a defective pressurized fluid supply system, essentially only from the elastic restoring force of the stops 86.

It should also be pointed out that, in the case of helical compression springs, these elastic stops 86 work with an essentially linear spring characteristic. If, for example, stacks of small disk springs or the like are used, it is also possible, depending on the installation conditions, to generate a degressive or a progressive characteristic $C_{AS}$.

It should be noted that, in the case of the embodiments described above, one does not necessarily have to provide this type of angle of rotation limitation in the area of both end walls 26, 28, although the embodiment described above is especially advantageous because of the uniformity of the loads being exerted. It is also possible to provide the circumferential recesses in the lateral surface of at least one of the end walls and to provide a corresponding projection on the second displacement chamber assembly in coordination with each recess. It should also be noted that the length of the circumferential recesses can obviously be adapted to suit the required range of angle of rotations, and possibly more than the two circumferential recesses shown can also be realized in one of the end walls or in the corresponding lateral surface of the second displacement chamber assembly.

Figure 10:
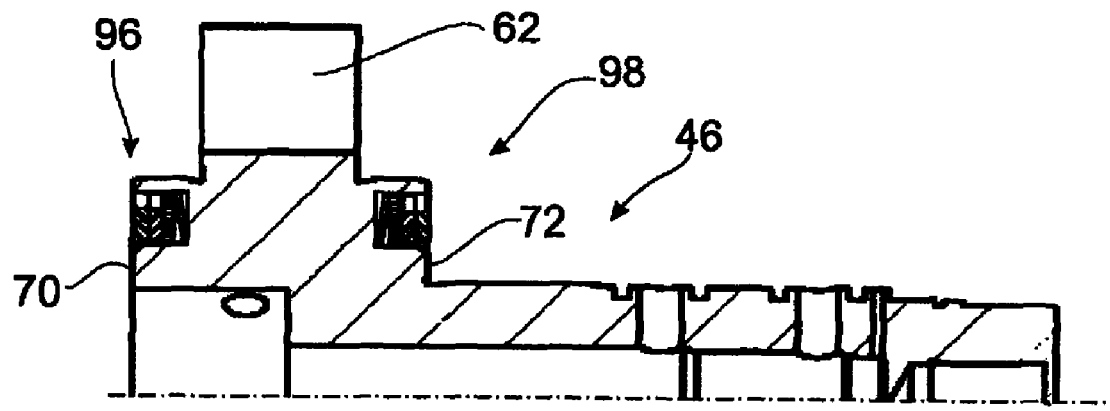
FIG. 10 shows a partial longitudinal cross section through an alternative type of design of a second displacement chamber assembly.
Figure 11:
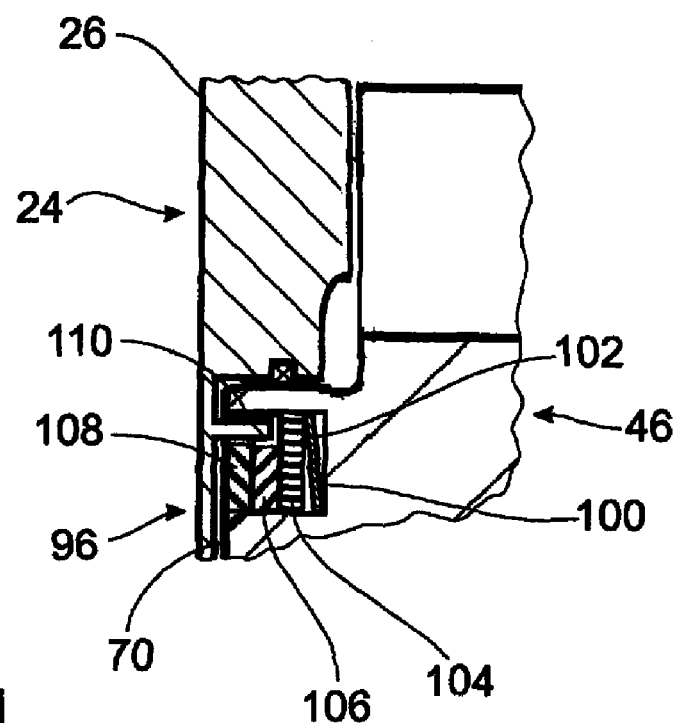
FIG. 11 shows an enlarged view of part of the second displacement chamber assembly shown in FIG. 10 in interaction with a first displacement chamber assembly.
Figure 12:
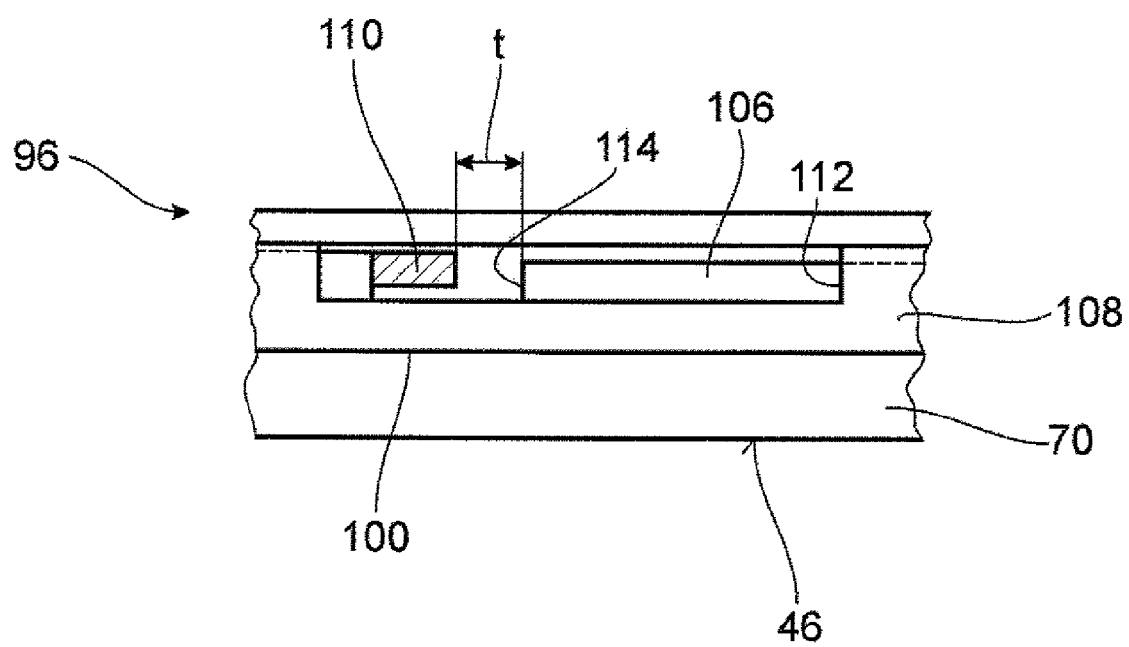
FIG. 12 shows a partial end view of a linear development of the displacement chamber assemblies shown in FIG. 11.

FIGS. 10-12 show another aspect of the present invention, according to which a friction device acts between the two displacement chamber assemblies. This device includes two friction device areas 96, 98, shown in FIG. 10, which, in the exemplary embodiment illustrated here, are again provided in the lateral surfaces 70, 72 of the second displacement chamber assembly 46 lying opposite the individual end walls 26, 28.

As the enlarged diagram of FIG. 11 shows by way of example on the basis of the friction device area 96, a mounting recess 100, open in the axial direction toward the lateral surface 70, is formed in the second displacement chamber assembly 46. This recess is preferably continuous in the circumferential direction and therefore forms an annular groove open to the lateral surface 70. On the bottom of the groove, a prestressing element 102, designed as a disk spring or a wave spring, for example, is axially supported and acts on a support ring 104. This ring can be dimensioned in such a way that it extends radially essentially over the entire width of the recess 100 but is able in principle to move axially under the spring-loading force of the prestressing element 102.

A friction ring 106 follows the support ring 104. The lateral surface of the friction ring 106 facing the support ring rests on the support ring 104 and thus, when there is relative rotation, to be described in more detail below, between the primary side and the secondary side, it slides on the support ring 104, thus producing a frictional interaction. The friction ring 106 is followed by a closure ring 108, acting as an abutment. After the prestressing element 102, the support ring 104 and the friction ring 106 have been placed in the recess 100, this closure ring is also placed in the recess 100 and is form-fit connected or material-fit connected to the second displacement chamber assembly 46. For example, the closure ring 108 can be provided with inside dimensions such that it can be inserted with a press-fit into the recess 100. Alternatively or in addition, it can be held in place by welding. In the axial direction, the closure ring 108 is then preferably flush with the lateral surface 70 of the second displacement chamber assembly 46.

An engaging projection 110 provided on the opposite side wall 26 engages axially in the recess 100 and thus extends past the closure ring 108. The engaging projection 110 therefore extends into the area of the friction ring 106 and interacts with it in such a way as to carry it along in the circumferential direction.

An example of this is shown in FIG. 12. We can see here an axial view of the end surface 70 of the second displacement chamber assembly 46 and the recess 100, which is open in the axial direction, which means here normal to the plane of the drawing. We can also see the closure ring 108, which can be dimensioned in such a way that it extends over the entire radial width of the recess 100, so that it, too, can be inserted into the outer circumferential area with a press-fit. In the circumferential direction, the closure ring 108 can have a circumferential opening 112 to cooperate with the engaging projection 110 and thus to allow this projection to pass through. The engaging projection 110 extends through this circumferential opening 112 as far as the area of a corresponding driver opening 114 in the friction ring 106, which, in the view of FIG. 12, is located behind the closure ring 108. When the engaging projection 110 moves in the circumferential direction upon relative rotation of the primary side versus the secondary side, e.g., from right to left in the linear development of FIG. 12, the resulting interaction with the friction ring 106 causes this ring to move along as well in the circumferential direction. As the friction ring 106 slides along the opposing friction surfaces of the support ring 104 and of the closure ring 108, it produces a frictional interaction under the load of the prestressing element 102.

Because the circumferential opening 112 in the closure ring 108, which, in this embodiment, is on the secondary side, that is, in the area of the second displacement chamber assembly 46, is bounded in the circumferential direction, it, in cooperation with the engaging projection 110 engaging in this circumferential opening 112 and/or passing through this opening, again creates an angle of rotation-limiting function. This means that the engaging projection 110 can only move together with the primary side versus the secondary side and thus versus the second displacement chamber assembly 46 to the extent of the circumferential length of the circumferential opening 112. If, in this embodiment, a limitation of circumferential movement is not desired, either the circumferential opening 112 can be designed with such a length that the angular rotation will be limited by other assemblies, or it can be continuous in the circumferential direction, which means that the closure ring 108 does not extend over the entire radial width of the recess 100.

It can also be seen in FIG. 12 that the circumferential length of the driver opening 114 is larger than that of the engaging projection 110. There is therefore a "dead spot" or play "t" present, which leads to a friction device which goes into action only after a certain delay after the direction of movement reverses. This means that, especially in the range of relatively small torque fluctuations, the engaging projection 110 is able to move relative to the friction ring 106 in the area of this dead spot "t" without the friction device area 96 becoming involved. Only after relatively large torque fluctuations occur will the friction ring 106 be carried along in the circumferential direction and thus generate a frictional force, which then adds its own contribution to the dissipation of the vibrational energy. For this reason, it is quite conceivable that, especially under consideration of the fact that a restoring force is also generated by the fluidic damping effect, means for mechanically limiting the angle of rotation can be omitted.

Concerning this design variant as well, it should be noted that a friction device area does not necessarily have to be provided on both axial sides, nor does the friction device area or areas with the components visible in FIG. 11 necessarily have to be provided in the second displacement chamber assembly. It would also be conceivable in principle that the recess 100 could be formed in an end wall and that an engaging projection could be provided on the opposite lateral surface of the second displacement chamber assembly. It is also conceivable that, to avoid imbalances on an end wall or the corresponding area of the second displacement chamber assembly, two engaging projections could be arranged at a distance of 1800 from each other, which then cooperate with the same friction ring. In place of a friction ring, of course, it would also be possible to use several friction elements arranged in a row in the circumferential direction, which would then be controlled by these individually assigned engaging projections. It should also be pointed out that a combination of the previously described design variants could be imagined. For example, the friction device shown in FIGS. 10-12 or a corresponding friction device area could be provided on one axial side between the second displacement chamber assembly and the assigned end wall, whereas, on the other axial side, the means for limiting the angle of rotation are realized as shown in FIGS. 3-8. The friction device area could then do without the functionality of angle of rotation limitation.

The invention is not limited by the embodiments described above which are presented as examples only but can be modified in various ways within the scope of protection defined by the appended patent claims.

I claim:
1. A torsional vibration damper comprising:
   a primary side;
   a secondary side which can rotate around an axis of rotation relative to the primary side;
   a damper fluid arrangement comprising at least one displacement chamber containing a first damper fluid and at least one compensating chamber containing a second damper fluid, wherein the second damper fluid is more compressible than the first damper fluid, wherein rotation of the primary side relative to the secondary side causes displacement of the first fluid from at least one said displacement chamber and compression of the second fluid in at least one said compensating chamber,
   a first displacement chamber assembly comprising a pair of axially opposed end walls bounding said at least one displacement chamber in both axial directions and a circumferential wall bounding said at least one displacement chamber in one radial direction;
   a second displacement chamber assembly bounding said at least one displacement chamber in the other radial direction;
   at least one circumferential recess provided in one of the first and second displacement chamber assemblies;
   at least one projection provided on the other of the first and second displacement chamber assemblies, said at least one projection engaging in said at least one circumferential recess to limit relative rotation of the first displacement chamber assembly relative to the second displacement chamber assembly.

2. The torsional vibration damper of claim 1 wherein said at least one circumferential recess is formed in an end surface of the one of the first and second displacement chamber assemblies.

3. The torsional vibration damper of claim 1 wherein said at least one circumferential recess has opposite ends defining a circumferentially limited length.

4. The torsional vibration damper of claim 3 further comprising an elastic stop in at least one of said opposite ends for stopping movement of a respective one of said projections in said recess.

5. The torsional vibration damper of claim 4 wherein the elastic stop comprises a spring.

6. The torsional vibration damper of claim 5 wherein the spring is prestressed in the elastic stop.

7. The torsional vibration damper of claim 1 further comprising a friction element on said one of said first and second displacement chamber assemblies and an opposing friction surface on said other of said first and second assemblies, said friction element being arranged to be carried along by the engaging projection and thereby moved in the circumferential direction along the opposing friction surface.

8. The torsional vibration damper of claim 7 wherein the friction element is received in the circumferential recess.

9. The torsional vibration damper of claim 8 further comprising a closure element partially closing off each said circumferential recess, said closure element providing said friction surface.

10. The torsional vibration damper of claim 9 wherein said closure element forms a boundary of the at least one circumferential recess.

11. The torsional vibration damper of claim 7 wherein the engaging projection cooperates with the friction element only after circumferential play has been overcome during relative rotation.

12. The torsional vibration damper of claim 1 further comprising a first circumferential boundary projection provided on the first displacement chamber assembly and extending radially toward the second displacement chamber assembly, and a second circumferential boundary projection provided on the second displacement chamber assembly and extending radially toward the first displacement chamber assembly, said first and second circumferential boundary projections bounding said at least one displacement chamber in opposite circumferential directions.

* * * * *